United States Patent
Lusthaus et al.

(10) Patent No.: US 9,824,318 B1
(45) Date of Patent: Nov. 21, 2017

(54) GENERATING LABOR REQUIREMENTS

(71) Applicant: Amazon Technologies, Inc., Reno, NV (US)

(72) Inventors: Michael Lusthaus, Toronto (CA); Kashif Usmani, Scarborough (CA); Borys Derevyanchenko, Vaughan (CA); Julien Samuel Lord, Toronto (CA)

(73) Assignee: Amazon Technologies, Inc., Reno, NV (US)

( * ) Notice: Subject to any disclaimer, the term of this patent is extended or adjusted under 35 U.S.C. 154(b) by 1009 days.

(21) Appl. No.: 14/036,785

(22) Filed: Sep. 25, 2013

(51) Int. Cl.
*G06Q 10/00* (2012.01)
*G06Q 10/06* (2012.01)

(52) U.S. Cl.
CPC .............................. *G06Q 10/06312* (2013.01)

(58) Field of Classification Search
CPC ............ G06Q 10/00–99/00; G06F 1/00–21/00
See application file for complete search history.

(56) References Cited

U.S. PATENT DOCUMENTS

| | | | | |
|---|---|---|---|---|
| 3,703,725 A * | 11/1972 | Gomersall | ......... | G05B 19/4189 198/358 |
| 5,369,570 A * | 11/1994 | Parad | ..................... | G06Q 10/06 700/99 |
| 5,446,671 A * | 8/1995 | Weaver | .............. | G06Q 10/0631 700/100 |
| 5,706,200 A * | 1/1998 | Kumar | ............. | G05B 19/41865 700/100 |
| 5,805,807 A * | 9/1998 | Hanson | ................... | B60R 11/02 235/462.01 |
| 5,918,226 A * | 6/1999 | Tarumi | ................... | G06Q 10/10 |
| 5,940,298 A * | 8/1999 | Pan | ..................... | G05B 19/4184 700/100 |
| 5,946,661 A * | 8/1999 | Rothschild | ....... | G05B 19/41865 377/16 |
| 6,141,598 A * | 10/2000 | Nam | ..................... | B23P 21/004 700/95 |
| 6,144,893 A * | 11/2000 | Van Der Vegt | ........ | G06Q 10/04 700/100 |
| 6,198,980 B1 * | 3/2001 | Costanza | ......... | G05B 19/41865 700/97 |

(Continued)

OTHER PUBLICATIONS

Wang, Qian, Geraint W. Owen, and Antony R. Mileham. "Comparison between fixed-and walking-worker assembly lines." Proceedings of the Institution of Mechanical Engineers, Part B: Journal of Engineering Manufacture 219.11 (2005): 845-848.*

(Continued)

*Primary Examiner* — Alan S Miller
(74) *Attorney, Agent, or Firm* — Thomas|Horstemeyer, LLP

(57) ABSTRACT

Disclosed are various implementations for a labor recommendation application. Historical worker assignments and work buffer states for materials processing facilities are selected. Lost labor times are determined as a function of the historical worker assignments and buffer states. A statistical analysis is performed on the lost labor times, the historical worker assignments, or the work buffer states. A labor recommendation for a materials processing facility to minimize estimated lost labor time.

19 Claims, 4 Drawing Sheets

(56) References Cited

U.S. PATENT DOCUMENTS

| | | | | |
|---|---|---|---|---|
| 6,201,999 | B1* | 3/2001 | Jevtic | G03F 7/70533 118/719 |
| 6,226,561 | B1* | 5/2001 | Tamaki | G06Q 10/06 700/100 |
| 6,393,332 | B1* | 5/2002 | Gleditsch | G06Q 10/06 700/100 |
| 6,400,999 | B1* | 6/2002 | Kashiyama | G05B 19/41865 700/100 |
| 6,578,005 | B1* | 6/2003 | Lesaint | G06Q 10/06 705/7.14 |
| 6,594,535 | B1* | 7/2003 | Costanza | G05B 19/41865 700/97 |
| 6,684,119 | B2* | 1/2004 | Burnard | G06Q 10/08 700/106 |
| 6,801,820 | B1* | 10/2004 | Lilly | G06Q 10/06 700/100 |
| 7,039,595 | B1* | 5/2006 | Lilly | G06Q 10/0631 705/7.12 |
| 7,243,074 | B1* | 7/2007 | Pennisi, Jr. | G06Q 10/06312 705/7.22 |
| 7,283,971 | B1* | 10/2007 | Levine | G06Q 10/06 705/7.13 |
| 7,331,471 | B1* | 2/2008 | Shakes | B07C 7/005 209/559 |
| 7,379,782 | B1* | 5/2008 | Cocco | G06Q 10/06 700/103 |
| 7,747,543 | B1* | 6/2010 | Braumoeller | G06Q 10/083 705/330 |
| 8,078,485 | B1* | 12/2011 | Kraehmueller | G06Q 10/063 705/7.11 |
| 8,156,500 | B2* | 4/2012 | Helander | G06F 9/4887 703/22 |
| 8,386,639 | B1* | 2/2013 | Galvin | G06Q 10/06 370/270 |
| 8,510,144 | B1* | 8/2013 | Hamilton | G06Q 10/06311 705/7.11 |
| 8,880,615 | B2* | 11/2014 | Tummalapenta | G06Q 10/06 705/301 |
| 2002/0026257 | A1* | 2/2002 | Newmark | G05B 19/41805 700/108 |
| 2002/0103559 | A1* | 8/2002 | Gartstein | G06Q 10/04 700/99 |
| 2002/0145559 | A1* | 10/2002 | Sullivan | G07C 1/10 342/357.74 |
| 2003/0050830 | A1* | 3/2003 | Troyer | G06Q 10/06 705/7.38 |
| 2004/0107133 | A1* | 6/2004 | Pantaleo | G06Q 10/06 705/7.13 |
| 2004/0181467 | A1* | 9/2004 | Raiyani | G06Q 10/087 705/28 |
| 2005/0021384 | A1* | 1/2005 | Pantaleo | G06Q 10/06 705/7.13 |
| 2005/0154625 | A1* | 7/2005 | Chua | G06Q 10/06 700/100 |
| 2005/0192783 | A1* | 9/2005 | Lystad | G06Q 10/06312 703/3 |
| 2005/0278062 | A1* | 12/2005 | Janert | G06Q 10/08 700/214 |
| 2006/0015203 | A1* | 1/2006 | Fukushima | G06Q 10/06 700/100 |
| 2006/0100917 | A1* | 5/2006 | Macy | G06Q 10/0631 705/7.12 |
| 2006/0136085 | A1* | 6/2006 | Steinhilper | G05B 19/41865 700/111 |
| 2007/0143169 | A1* | 6/2007 | Grant | G06Q 10/06 705/7.14 |
| 2007/0236724 | A1* | 10/2007 | Rai | G06F 3/1214 358/1.15 |
| 2007/0239300 | A1* | 10/2007 | Burda | G06Q 10/06 700/100 |
| 2007/0239303 | A1* | 10/2007 | Burda | G06Q 10/06 700/101 |
| 2008/0015884 | A1* | 1/2008 | Jamula | G06Q 10/08 705/330 |
| 2009/0063238 | A1* | 3/2009 | Storzum | G06Q 10/10 705/7.42 |
| 2009/0138315 | A1* | 5/2009 | Schroeder | G06Q 10/06 705/12 |
| 2009/0150209 | A1* | 6/2009 | Levine | G06Q 10/06311 705/7.13 |
| 2010/0257015 | A1* | 10/2010 | Molander | G06Q 10/1097 705/7.21 |
| 2011/0066467 | A1* | 3/2011 | Kapoor | G06Q 10/06 705/7.12 |
| 2011/0125539 | A1* | 5/2011 | Bollapragada | G06Q 10/043 705/7.12 |
| 2011/0270438 | A1* | 11/2011 | Shimamura | G06Q 10/08 700/214 |
| 2012/0078673 | A1* | 3/2012 | Koke | G06Q 10/06 705/7.13 |
| 2014/0244333 | A1* | 8/2014 | Bournas | G06Q 10/063116 705/7.16 |

OTHER PUBLICATIONS

Hopp, Wallace J., Eylem Tekin, and Mark P. Van Oyen. "Benefits of skill chaining in serial production lines with cross-trained workers." Management Science 50.1 (2004): 83-98.*

Lozinski, Christopher, and C. Roger Glassey. "Bottleneck starvation indicators for shop floor control [semiconductor manufacturing process]." IEEE Transactions on Semiconductor Manufacturing 1.4 (1988): 147-153.*

Barlatt, Ada Yetunde. Models and algorithms for workforce allocation and utilization. Diss. Ford Motor Company, 2009.*

Mary Ann Anderson, MSE, Edward J. Anderson, Geoffrey Parker "How to Manage Bottlenecks in Operations Management"; Operations Management for Dummies; ISBN 978-1-118-55106-6, Jul. 2013 (as available online no later than Aug. 28, 2013).*

Christian Reinboth "Capacity, bottleneck, process capacity, flow rate and utilization", An Introduction to Operations Management, Jul. 4, 2013, (https://lecturenotesblog.wordpress.com/2013/07/04/capacity-bottleneck-process-capacity-flow-rate-and-utilization).*

* cited by examiner

GENERATING LABOR REQUIREMENTS

BACKGROUND

Materials processing facilities may experience periods of increased workload or worker inefficiency. For example, seasonal periods of high customer demand may result in increased processing activity. Inexperienced workers may not operate at full efficiency for a period after the establishment of a new materials processing facility. These periods may result in lost labor time due to transitioning workers between processing stages, idle workers, or other factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Materials processing facilities such as warehouses, fulfillment centers, distribution houses, or other facilities may experience lost labor time. For example, during seasons where customer purchases increase in number, the materials processing facility may experience an increase in activity to process orders or manage inventory. As another example, a new materials processing facility may be operating at a lower level of efficiency during its establishment period. During these periods, certain processing stages within the materials processing facility may require more assigned workers to perform their assigned tasks. This may necessitate a transition of workers to that processing stage from another processing stage. The worker is not actively processing work during the transition, resulting in a period of lost labor. As another example, an overstaffed processing stage may complete its assigned work too quickly, and remain idle until another processing stage provides it with work. This period of idleness is also lost labor time.

A labor recommendation application generates a labor recommendation for a materials processing facility to minimize an estimated amount of lost labor hours. To do so, the labor recommendation application accesses historical worker assignments for processing stages in a materials processing facility. The labor recommendation application also accesses historical buffer states of the processing stages. The historical worker assignments and buffer states may correspond to materials processing facilities sharing similar attributes with respect to the materials processing facility for which the recommendation is generated.

The historical worker assignments and buffer states may also correspond to similar periods for which a recommendation is generated. For example, to generate a recommendation for a seasonal work period, the labor recommendation may access historical worker assignments and buffer states corresponding to previous instances of the seasonal work period. As another example, the labor recommendation may access historical worker assignments and buffer states corresponding to establishment periods of other materials processing facilities to generate a recommendation for a new materials processing facility.

The historical worker assignments and buffer states are then used to calculate past lost labor time. The labor recommendation application may then generate a recommendation to minimize an estimated lost labor time calculated from the past lost labor time, historical worker assignments, and buffer states. In the following discussion, a general description of the system and its components is provided, followed by a discussion of the operation of the same.

Figure 1:
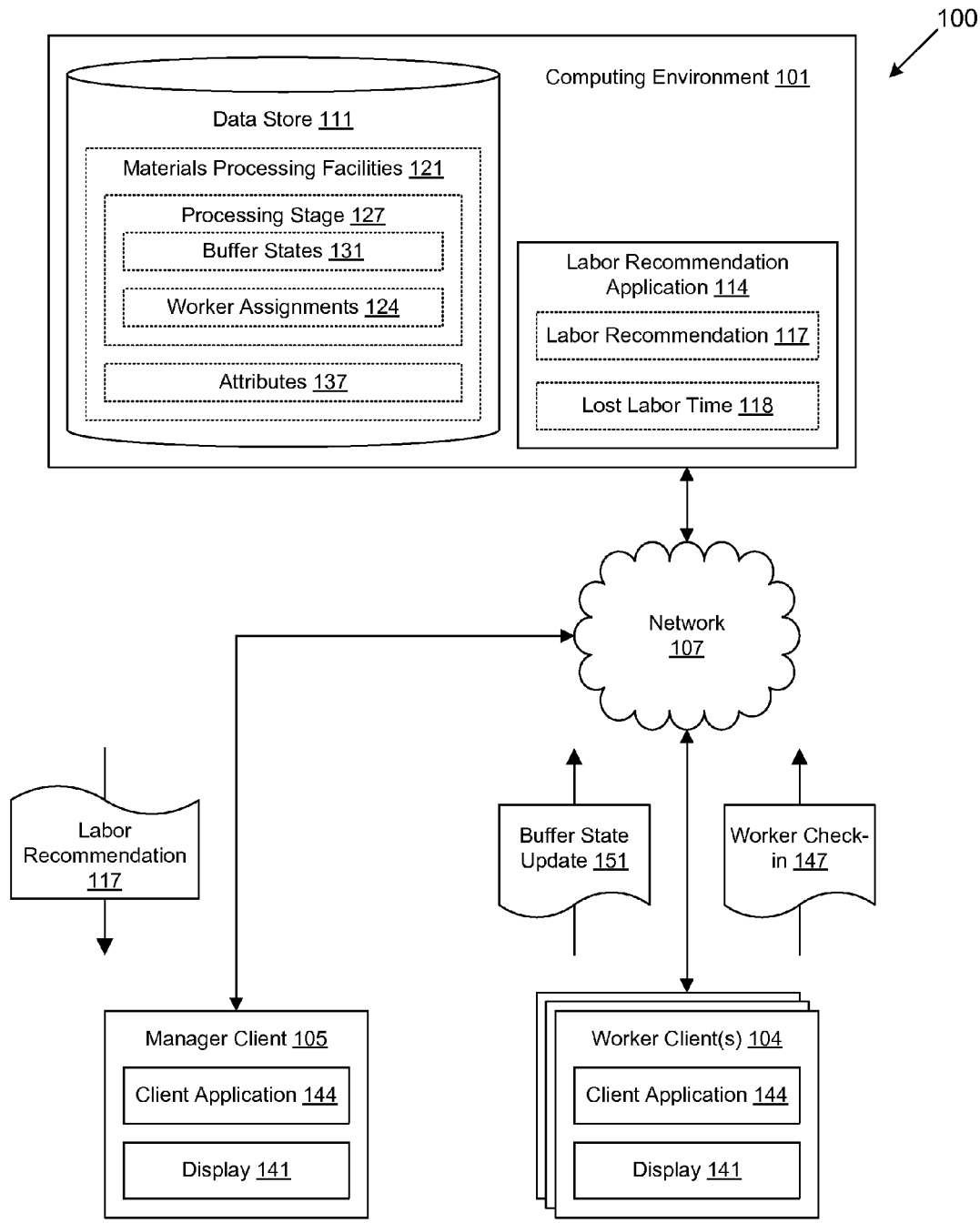
FIG. 1 is a drawing of a networked environment according to various implementations of the present disclosure.

With reference to FIG. 1, shown is a networked environment 100 according to various implementations. The networked environment 100 includes a computing environment 101, a worker client 104 and a manager client 105, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 101 may comprise, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a hosted computing resource, a grid computing resource and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various implementations. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a labor recommendation application 114, and other applications, services, processes, systems, engines, or functionality not discussed in detail herein. The labor recommendation application 114 is executed to generate a labor recommendation 117 for a materials processing facility 121 which minimizes an amount of estimated lost labor time 118.

The labor recommendation 117 may comprise, for example, recommended worker assignments 124 indicating a number of workers to be assigned to a processing stage 127 of the materials processing facility 121. The labor recommendation 117 may also comprise, for example, a general recommendation for a number of workers to be assigned to the materials processing facility 121. The labor recommendation 117 may also be defined with respect to periods of time. For example, the labor recommendation 117 may recommend a worker assignment 124 for a higher number of employees for a seasonal work period, and a lower number of employees for a period after the seasonal work period. The labor recommendation 117 may also comprise other data.

Lost labor time 118 is an amount of time during which a worker assigned to a processing stage 127 is not performing a corresponding action designated to the processing stage 127. This may include, for example, a period of worker idleness due to insufficient pending work at the processing stage 127. This may also include a period of transition between processing stages 127 after a worker is assigned to a new processing stage 127. This may also correspond to an amount of work offset by a period of inefficiency, such as during an establishment period of a materials processing facility 121, a period after a worker is assigned to a new processing stage 127, a period of worker orientation or acclimatization, or other periods.

The data stored in the data store 111 includes, for example, data associated with materials processing facilities 121, including processing stages 127, buffer states 131, worker assignments 124, attributes 137, and potentially other data. Materials processing facilities 121 correspond to a warehouse, fulfillment center, returns center, or other location processing items for distribution, sale, rental, or other items. The materials processing facilities 121 implement one or more processing stages 127 to perform the processing of items. The processing stages 127 may correspond to an action in a processing workflow, such as unloading, sorting, unpackaging, packaging, storing, or another action. The processing stages 127 may be organized into a sequential workflow, whereby the output of one processing stage 127 is then transferred as input to another processing stage 127.

Buffer states 131 indicate an amount of work awaiting processing at a processing stage 127 at a given time. The buffer state 131 may indicate a number of items awaiting processing, a number of normalized work units awaiting processing, or other data. Worker assignments 124 indicate a number of workers assigned to a processing stage 127 at a given time. Workers may include human labor, robotic or automated labor, or other entities.

Attributes 137 include various descriptive data points corresponding to a materials processing facility 121. Attributes 137 may include, for example, geographical locations, categories or classifications of items processed by the materials processing facility 121, an amount of items processed by the materials processing facility 121, or other descriptive data points.

The worker clients 104 and manager client 105 are representative of a plurality of client devices that may be coupled to the network 107. The worker clients 104 and manager client 105 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The worker clients 104 and manager client 105 may each include a display 141. The display 141 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The worker clients 104 and manager client 105 may each be configured to execute various applications such as a client application 144 and/or other applications. The client application 144 may be executed in a worker client 104 and manager client 105, for example, to access network content served up by the computing environment 101 and/or other servers, thereby rendering a user interface on the display 141. To this end, the client application 144 may comprise, for example, a browser, a dedicated application, etc., and the user interface may comprise a network page, an application screen, etc. The worker clients 104 and manager client 105 may each be configured to execute applications beyond the client application 144 such as, for example, email applications, social networking applications, word processors, spreadsheets, and/or other applications.

Next, a general description of the operation of the various components of the networked environment 100 is provided. To begin, the labor recommendation application 114 obtains past work assignments 124 and buffer states 131 to generate a labor recommendation 117 for a materials processing facility 121. The past work assignments 124 and buffer states 131 may include work assignments 124 and buffer states 131 aggregated over time. For example, worker check-ins 147 may be obtained from worker clients 104 by the labor recommendation 114 or other functionality executed in the computing environment 101. The worker check-in 147 includes data indicative of a worker beginning work at a processing stage 127 indicated by the worker check-in 147. The worker check-in 147 may also include a timestamp or other temporal identifier. Worker assignments 124 for a particular time period may then be generated as a function of a number of worker check-ins 147 performed with respect to the corresponding processing stage 127.

Buffer state updates 151 may also be obtained from worker clients 104 and aggregated over time to determine a buffer state 131 at a given time. For example, a worker client 104 may scan or otherwise accept as input an identifier of a component of work added to or removed from a buffer of a processing stage 127. In other implementations, a worker client 104 may communicate an indication of an entire buffer state 131 at a given time. In further embodiments, a process or service executed in the computing environment 101 may query processing stages 127 to obtain a current buffer state 131, thereby determining a buffer state update 151 according to previous buffer states 131. Buffer states 131 and buffer state updates 151 may also be aggregated by other approaches.

In some implementations, the labor recommendation 117 may correspond to a defined time period, such as a seasonal or holiday work period. The defined time period may also include a period after the startup of a newly established materials processing facility 121, called an establishment period. In such an implementation, the labor recommendation application 114 may obtain past work assignments 124 and buffer states 131 corresponding to the defined time period.

For example, to generate a labor recommendation 117 corresponding to a seasonal work period, the labor recommendation application 114 may select those buffer states 131 and worker assignments 124 corresponding to occurrences of the seasonal work period in previous years. As another example, to generate a labor recommendation 117 corresponding to an establishment period, the labor recommendation application 114 may select those buffer states and worker assignments 124 corresponding to establishment periods of other materials processing facilities 121.

The buffer states 131 and worker assignments 124 obtained by the labor recommendation application 114 may correspond to the materials processing facility 121 for which the labor recommendation 117 will be generated. In some implementations, the buffer states 131 and worker assignments 124 obtained by the labor recommendation application 114 may include buffer states 131 and worker assignments 124 associated with other materials processing facilities 121. In such an implementation, the labor recommendation application 114 may select buffer states 131 and worker assignments 124 from the entirety of accessible materials processing facilities 121, or a subset of the materials processing facilities 121. For example, the labor recommendation application 114 may select buffer states 131 and worker assignments 124 for materials processing facilities 121 having a degree of similarity meeting or exceeding a threshold with respect to the materials processing facility 121 for which the labor recommendation 117 is generated. The degree of similarity may be calculated as a function of attributes 137, or other data points.

Next, the labor recommendation application 114 determines lost labor time 118 for the selected buffer states 131 and worker assignments 124. In some implementations, this may comprise loading data embodying precalculated or prerecorded lost labor time 118 encoded in the buffer states 131 or worker assignments 124. In other implementations, this may include calculating lost labor time 118 from buffer states 131 indicating an empty buffer. For example, a lost labor time 118 may be calculated as the time elapsed between a first buffer state 131 indicating an empty buffer and a subsequent buffer state 131 indicating a non-empty buffer. In some implementations, this lost labor time 118 may be normalized or weighted according to a number of workers indicated in a corresponding worker assignment 124. Lost labor time 118 may also be calculated as a function of buffer states 131 by another approach.

Lost labor time 118 may also be calculated as a function of worker assignments 124. For example, worker assignments 124 may indicate a worker assigned to a first processing stage 127 that is reassigned to a second processing stage 127. Calculating the lost labor time 118 may include calculating a difference in time between a worker check-in 147 at the second processing stage 127 and an earlier action by the worker. The earlier action may comprise a check-out, log out, buffer state update 151, or another action. Calculating the lost labor time 118 may also comprise assigning a default, estimated, or average lost labor time 118 value for a detected transition between processing stages 127.

Additionally, in some implementations, the lost labor times 118 or data from which the lost labor times 118 are generated, including buffer states 131 and worker assignments 124, may be weighted according to various criteria. For example, in some implementations, weights may be generated as a function of a degree of similarity between the materials processing facility 121 for which the labor recommendation 117 is generated and a respective other materials processing facility 121. The degree of similarity may be calculated as a function of attributes 137, or other data. In other implementations, weights may be generated according to work periods. For example, lost labor times 118 corresponding to a seasonal work period for which the labor recommendation 117 is generated may be weighted higher than other lost labor times 118. As another example, buffer states 131 or worker assignments 124 corresponding to establishment periods may be weighted for labor recommendations 117 generated for an establishment period of a new materials processing facility 121. Additionally, weights may be predefined, assigned by manual input, or generated by another approach.

After calculating the lost labor times 118, the labor recommendation application 114 then generates the labor recommendation 117 for the materials processing facility 121 to minimize lost labor time 118. In some implementations, the labor recommendation 117 may comprise a recommended worker assignment 124 for a processing stage 127. For example, the labor recommendation application 114 may recommend a number of workers for the processing stage 127 that is less than a historical worker assignment 124 corresponding to calculated lost labor time 118 resulting from worker idleness. As another example, the labor recommendation application 114 may recommend a number of workers for a processing stage 127 that is greater than a worker assignment 124 corresponding to calculated lost labor times 118 resulting from transitioning workers to the processing stage 127.

The labor recommendation 117 may also include recommended numbers of workers who are not assigned to designated processing stages 127, such as problem solvers, inspectors, managers, special handlers, or other workers who may operate independent of processing stages 127. The labor recommendation 117 may further include an overall recommended number of workers independent of processing stages 127. The labor recommendation 117 may also include other data.

Generating the labor recommendation 117 may comprise calculating a statistical correlation between the historical worker assignments 124 and calculated lost labor times 118. This may include calculating a Pearson correlation coefficient, a rank correlation coefficient, distance correlation, Brownian covariance, or other value. The labor recommendation 117 may then be generated to minimize lost labor time 118 as a function of the statistical correlation. The labor recommendation 117 may also be calculated by another approach.

The labor recommendation 117 is then communicated to a manager client 105. This may include encoding a document, spreadsheet, or other data object embodying the labor recommendation 117. This may also comprise generating a notification, email, network page, or other content communicated to the manager client 105 for rendering by a client application 144. The labor recommendation 117 may also be communicated to a manager client 105 by another approach.

Figure 2:
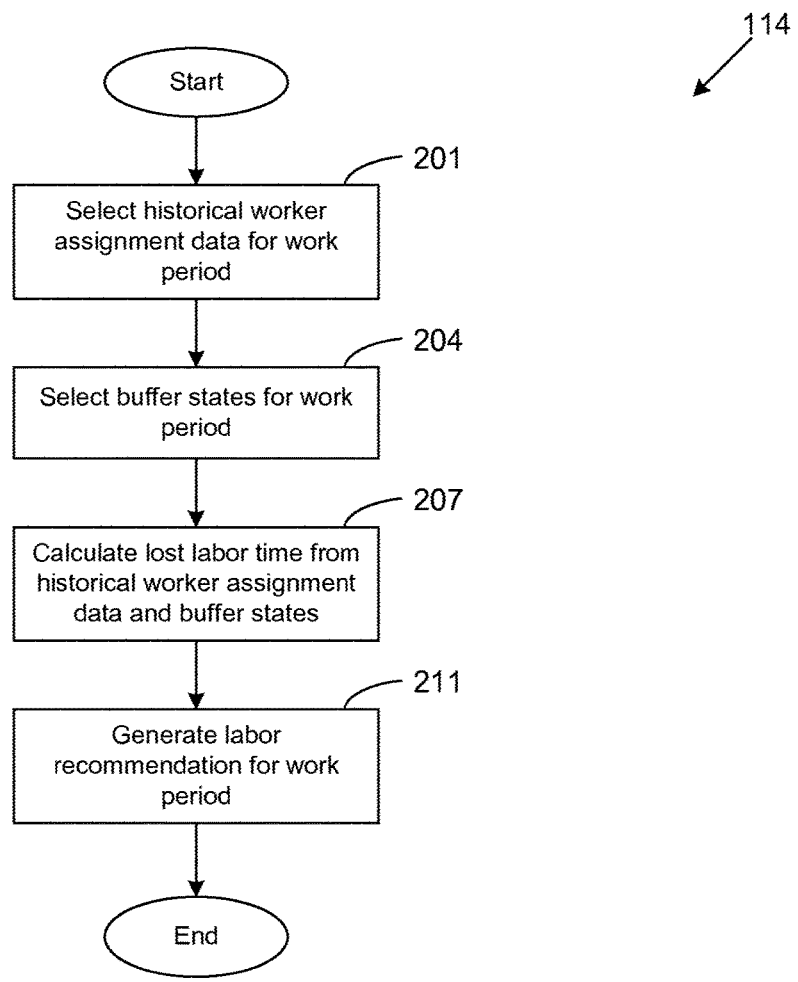
FIGS. 2 and 3 are flowcharts illustrating examples of functionality implemented as portions of a labor recommendation application executed in a computing environment in the networked environment of FIG. 1 according to various implementations of the present disclosure.

Referring next to FIG. 2, shown is a flowchart that provides one example of the operation of a portion of the labor recommendation application 114 according to various implementations. It is understood that the flowchart of FIG. 2 provides merely an example of the many different types of functional arrangements that may be employed to implement the operation of the portion of the labor recommendation 114 as described herein. As an alternative, the flowchart of FIG. 2 may be viewed as depicting an example of elements of a method implemented in the computing environment 101 (FIG. 1) according to one or more implementations.

Beginning with box 201, the labor recommendation application 114 selects historical worker assignment 124 (FIG. 1) data corresponding to a work period. The work period may include, for example, a seasonal work period, a holiday work period, or another work period. The selected historical worker assignment 124 data may correspond to previous occurrences of a work period. For example, to generate a labor recommendation 117 (FIG. 1) for a Christmas holiday work period, the labor recommendation application 114 may select historical worker assignments 124 corresponding to Christmas holiday work periods for previous years. The selected historical worker assignment 124 data may correspond to the materials processing facility 121 (FIG. 1) for which the labor recommendation 117 is generated, or other materials processing facilities 121. The historical worker assignment 124 data may also be selected by another approach.

Next, in box 204, the labor recommendation application 114 selects historical buffer states 131 (FIG. 1) data corresponding to the work period for which the labor recommendation 117 will be generated. The buffer states 131 may be selected according to a similar approach as the historical worker assignment 124 as described above with respect to box 201.

After selecting the historical worker assignment 124 data and buffer states 131 for the work period, the labor recommendation application 114 calculates lost labor times 118 (FIG. 1) for the work period. In some implementations, this may comprise loading data embodying precalculated or prerecorded lost labor times 118 encoded in the buffer states 131 or worker assignments 124. In other implementations, this may include calculating lost labor times 118 from buffer states 131 indicating an empty buffer. For example, a lost labor time 118 may be calculated as the time elapsed between a first buffer state 131 indicating an empty buffer and a subsequent buffer state 131 indicating a non-empty buffer. In some implementations, this lost labor time 118 may be normalized or weighted according to a number of workers indicated in a corresponding worker assignment 124. Lost labor time 118 may also be calculated as a function of buffer states 131 by another approach.

In further implementations, worker assignments 124 may indicate a worker assigned to a first processing stage 127 (FIG. 1) that is reassigned to a second processing stage 127. In these implementations, calculating lost labor times 118 may include calculating a difference in time between a worker check-in 147 (FIG. 1) at the second processing stage 127 and an earlier action by the worker. The earlier action may comprise a check-out, log out, buffer state update 151, or another action.

A lost labor time 118 may also be calculated according to a predefined amount of time a worker is assigned to a processing stage 127 and a subsequent worker check-in 147. For example, a worker assignment 124 may indicate that a worker is to be assigned to a first processing stage until a defined point in time. Two hours after that defined point in time, the worker communicates a worker check-in 147 at a second processing stage 127. A lost labor time 118 of two hours may then be calculated from the time at which a worker was scheduled to leave the first processing stage 127 until the subsequent worker check-in 147 at the second processing stage 127.

Calculating the lost labor time 118 may also comprise assigning a default, estimated, or average lost labor time 118 value for a detected transition between processing stages 127. Lost labor times 118 may also be calculated by another approach.

The labor recommendation application 114 then generates a labor recommendation 117 for the work period in box 211. This may include, for example, performing a statistical correlation analysis on the lost labor times 118, the historical worker assignments 124, or the buffer states 131. The statistical correlation analysis may include calculating weights for the lost labor times, the historical worker assignments 124, or the buffer states 131. For example, the labor recommendation application 114 may weigh higher the lost labor times, historical worker assignments 124, or buffer states 131 corresponding to materials processing facilities 121 more similar to the materials processing facility 121 for which the labor recommendation 121 is generated. Determining similarity may comprise calculating a degree of similarity with respect to attributes 137 (FIG. 1) of the materials processing facilities 121. The labor recommendation application 114 may also be generated by another approach.

Figure 3:
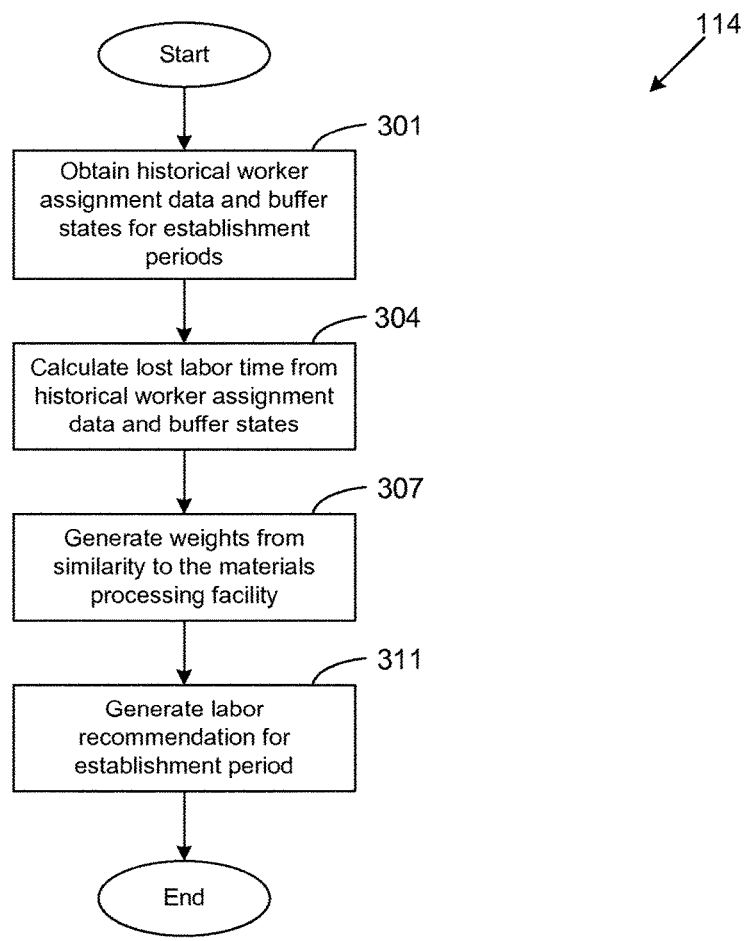

Turning now to FIG. 3, shown is a flowchart that provides one example of the operation of a portion of the labor recommendation application 114 according to various implementations. It is understood that the flowchart of FIG. 3 provides merely an example of the many different types of functional arrangements that may be employed to implement the operation of the portion of the labor recommendation 114 as described herein. As an alternative, the flowchart of FIG. 3 may be viewed as depicting an example of elements of a method implemented in the computing environment 101 (FIG. 1) according to one or more implementations.

Beginning with box 301, the labor recommendation application 114 selects historical worker assignment 124 (FIG. 1) data and buffer states 131 (FIG. 1) corresponding to establishment periods of materials processing facilities 121 (FIG. 1) distinct from a materials processing facility 121 for which a labor recommendation 117 (FIG. 1) will be generated. The establishment period may include a predefined duration after the establishment of a materials processing facility 121. The establishment period may also comprise a duration between the establishment of a materials processing facility 121 and a predefined event. The predefined event may include reaching a predetermined efficiency level, processing a predefined amount of throughput, or another event.

The historical worker assignment 124 data and buffer states 131 may be selected according to a degree of similarity between a respective materials processing facility 121 and the materials processing facility 121 for which the labor recommendation 117 will be generated. For example, historical worker assignment 124 data and buffer states 131 may be selected for those materials processing facilities 121 whose degree of similarity meets or exceeds a threshold. The degree of similarity may be calculated as a function of attributes 137 (FIG. 1) of materials processing facilities 121. This may include calculating a degree of similarity value as a function of the attributes 137. In other implementations, this may include determining if the attributes 137 of the materials processing facilities 121 match in a number of dimensions meeting or exceeding a threshold. The historical worker assignment 124 data and buffer states 131 may also be selected by another approach.

After selecting the historical worker assignment 124 data and buffer states 131 for the establishment period, the labor recommendation application 114 calculates lost labor times 118 (FIG. 1) for the establishment period. In some implementations, this may comprise loading data embodying precalculated or prerecorded lost labor times 118 encoded in the buffer states 131 or worker assignments 124. In other implementations, this may include calculating lost labor times 118 from buffer states 131 indicating an empty buffer.

In further implementations, worker assignments 124 may indicate a worker assigned to a first processing stage 127 (FIG. 1) that is reassigned to a second processing stage 127. Calculating the lost labor time 118 may also comprise assigning a calculated default, estimated, or average lost labor time 118 value for a detected transition between processing stages 127. Additionally, lost labor times 118 may include estimated or default lost labor times 118 to account for a decline in worker efficiency during the establishment period. Lost labor times 118 may also be calculated by another approach.

The labor recommendation application 114 then generates a labor recommendation 117 for the work period in box 311. This may include, for example, performing a statistical correlation analysis on the lost labor times 118, the historical worker assignments 124, or the buffer states 131. For example, the labor recommendation application 114 may calculate a Pearson correlation coefficient, a rank correlation coefficient, distance correlation, Brownian covariance, or other value with respect to the lost labor times 118, the historical worker assignments 124, or the buffer states 131. The labor recommendation application 114 may also be generated by another approach.

Figure 4:
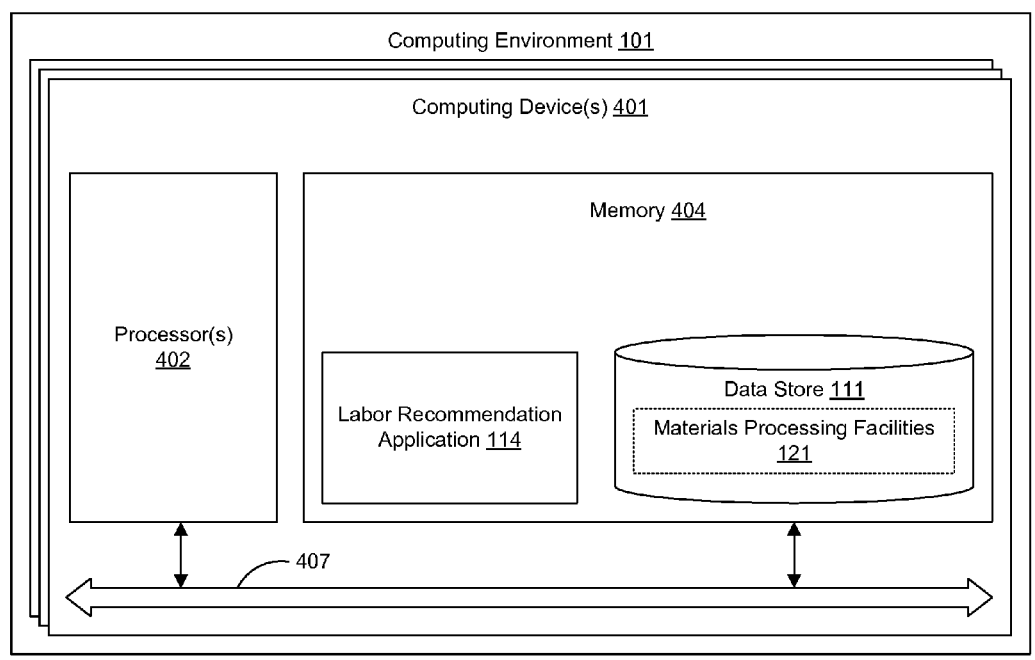
FIG. 4 is a schematic block diagram that provides one example illustration of a computing environment employed in the networked environment of FIG. 1 according to various implementations of the present disclosure.

With reference to FIG. 4, shown is a schematic block diagram of the computing environment 101 according to an implementation of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a labor recommendation application 114, and potentially other applications. Also stored in the memory 404 may be a data store 111 storing materials processing facilities 121 data and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the labor recommendation application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the labor recommendation application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some implementations, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the labor recommendation application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the labor recommendation application 114, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 401, or in multiple computing devices in the same computing environment 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
   query, over a network, a plurality of worker client devices for a plurality of past worker assignments and a plurality of work buffer states, individual ones of the worker client devices being associated with one of a plurality of processing stages in one of a plurality of materials processing facilities, individual ones of the worker client devices receiving an input from a worker indicative of an initial time of the worker beginning work at one of the processing stages and the input being used to determine a timestamp of a check-in of the worker, each work buffer state representing an amount of work awaiting processing at one of the plurality of processing stages at a particular time period;
   receive from the individual ones of the worker client devices the past worker assignments and the work buffer states, the past worker assignments and the work buffer states being retrieved from a memory of the worker client devices;
   select a subset of the plurality of past worker assignments for a predefined work period associated with the processing stages of the materials processing facilities;
   determine a lost labor time as a function of a change in the amount of work awaiting processing at the one of the plurality of processing stages between a first one of the plurality of work buffer states associated with a first time period and a second one of the plurality of work buffer states associated with a second time period;
   generate a labor recommendation for the one of the plurality of processing stages of at least one of the materials processing facilities as a function of a statistical correlation between the subset of the past worker assignments and the lost labor time, the labor recommendation being associated with the predefined work period and including a recommended number of workers that is different from a current number of workers assigned to the one of the plurality of processing stages of the at least one of the materials processing facilities;
   encode the labor recommendation for display on a manager client device;
   wherein the labor recommendation reduces a predicted amount of lost labor time associated with the at least one of the materials processing facilities; and
   wherein the subset of the past worker assignments, the work buffer states, or the lost labor time are weighted as a function of at least one previous occurrence of the predefined work period.

2. The non-transitory computer-readable medium of claim 1, wherein the predefined work period comprises a seasonal work period or an establishment period of the at least one of the materials processing facilities.

3. The non-transitory computer-readable medium of claim 1, wherein the subset of the past worker assignments, the work buffer states, or the lost labor time are weighted as a function of a degree of similarity between the at least one of the materials processing facilities and a respective one of the materials processing facilities, and the degree of similarity is determined based at least in part on a determination of a plurality of facility attributes corresponding between the at least one of the materials processing facilities and the respective one of the materials processing facilities.

4. The non-transitory computer-readable medium of claim 1, wherein the plurality of workers comprises a plurality of automated robotic devices.

5. A system, comprising:
at least one computing device; and
a labor recommendation application executed in the at least one computing device, wherein, when executed, the labor recommendation application causes the at least one computing device to at least:
query, over a network, a worker client device for historical worker assignment data and a plurality of work buffer states, the worker client device being associated with one of a plurality of processing stages in at least one materials processing facility, each work buffer state representing an amount of work awaiting processing at the one of the plurality of processing stages at a particular time period;
receive from the worker client device the historical worker assignment data and the work buffer states, the historical worker assignment data and the work buffer states being retrieved from a memory of the worker client device;
select a subset of the historical worker assignment data associated with a work period of the at least one materials processing facility;
generate a lost labor time data as a function of a change in the amount of work awaiting processing at the one of the plurality of processing stages between a first one of the plurality of work buffer states associated with a first time period and a second one of the plurality of work buffer states associated with a second time period;
generate a labor recommendation for the one of the plurality of processing stages as a function of the historical worker assignment data and the lost labor time data, wherein generating the labor recommendation comprises performing a statistical correlation between the lost labor time data and the historical worker assignment data, the labor recommendation being associated with the work period and including a recommended number of workers that is different from a current number of workers assigned to the one of the plurality of processing stages; and
wherein the labor recommendation reduces a predicted amount of lost labor time associated with the at least one materials processing facility.

6. The system of claim 5, wherein the at least one materials processing facility is a first at least one materials processing facility, the historical worker assignment data is further associated with a second at least one materials processing facility, and wherein generating the labor recommendation further causes the at least one computing device to weigh the historical worker assignment data or the lost labor time data as a function of a degree of similarity between the first at least one materials processing facility and the second at least one materials processing facility.

7. The system of claim 5, wherein the labor recommendation is associated with a seasonal work period, and wherein generating the labor recommendation further causes the at least one computing device to weigh the historical worker assignment data or the lost labor time data as a function of at least one previous occurrence of the seasonal work period.

8. The system of claim 5, wherein the labor recommendation is generated in accordance with an anticipated change in throughput of the at least one materials processing facility.

9. The system of claim 5, wherein the lost labor time data is generated as a function of at least one worker transition between a first processing stage of the at least one materials processing facility and a second processing stage of the at least one materials processing facility.

10. The system of claim 5, wherein the lost labor time data is generated as a function of an idle period for at least one worker of the at least one materials processing facility.

11. The system of claim 5, wherein the historical worker assignment data comprises a plurality of work buffer sizes of the processing stages.

12. The system of claim 5, wherein the labor recommendation comprises at least one recommended worker.

13. The system of claim 5, wherein the labor recommendation application further causes the at least one computing device to at least:
encode the labor recommendation in a file that comprises at least one of a document or a spreadsheet; and
transmit, over the network, the file to a manager client device for display.

14. A method, comprising:
querying, by a computing device over a network, a worker client device for a plurality of past worker assignments and a plurality of work buffer states, the worker client device being associated with one of a plurality of processing stages in one of a plurality of materials processing facilities, each work buffer state representing an amount of work awaiting processing at the one of the plurality of processing stages at a particular time period;
receiving, by the computing device, from the worker client device the plurality of past worker assignments and the work buffer states, the plurality of past worker assignments and the work buffer states being retrieved from a memory of the worker client device;
selecting, by the computing device, a subset of the plurality of past worker assignments associated with a work period of the one of the plurality of processing stages of at least one materials processing facility;
generating, by the computing device, lost labor time data based at least in part on a change in the amount of work awaiting processing at the one of the plurality of processing stages between a first one of the plurality of work buffer states associated with a first time period and a second one of the plurality of work buffer states associated with a second time period;
generating, by the computing device, a labor recommendation for the one of the plurality of processing stages of the at least one materials processing facility as a function of performing a statistical correlation between the lost labor time data and the past worker assignments, the labor recommendation being associated with the work period and including a recommended number of workers that is different from a current number of workers assigned to the one of the plurality of processing stages; and
wherein the labor recommendation minimizes a predicted amount of lost labor time associated with the at least one materials processing facility.

15. The method of claim 14, further comprising:
calculating, by the computing device, based at least in part on the past worker assignments, a lost labor time as a function of at least one worker transition between a first one of the processing stages and a second one of the processing stages of the at least one materials processing facility; and
wherein the labor recommendation is based at least in part on the lost labor time.

16. The method of claim 14, further comprising:
calculating, by the computing device, based at least in part on the work buffer states, a lost labor time as a function of a period of worker idleness indicated by an empty work buffer; and
wherein the labor recommendation is based at least in part on the lost labor time.

17. The method of claim 14, wherein the labor recommendation is generated as a function of an establishment period of the at least one materials processing facility.

18. The method of claim 14, wherein the labor recommendation is associated with a seasonal work period, and generating the labor recommendation further comprises weighing, by the computing device, the past worker assignments or the work buffer states as a function of at least one previous occurrence of the seasonal work period.

19. The method of claim 14, further comprising:
adding, by the computing device, timestamp data to a plurality of aggregated worker check-ins; and
wherein the past worker assignments comprise the aggregated worker check-ins.

* * * * *